(12) United States Patent
Morise (10) Patent No.: US 7,232,086 B2
(45) Date of Patent: Jun. 19, 2007

(54) SPINNING-REEL OSCILLATING DEVICE

(75) Inventor: Taisei Morise, Osaka (JP)

(73) Assignee: Shimano Inc., Osaka (JP)

( * ) Notice: Subject to any disclaimer, the term of this patent is extended or adjusted under 35 U.S.C. 154(b) by 164 days.

(21) Appl. No.: 11/002,633

(22) Filed: Dec. 3, 2004

(65) Prior Publication Data

US 2005/0127221 A1  Jun. 16, 2005

(30) Foreign Application Priority Data

Dec. 9, 2003 (JP) ............................. 2003-410131
Feb. 23, 2004 (JP) ............................. 2004-045644

(51) Int. Cl.
*A01K 89/01* (2006.01)

(52) U.S. Cl. ...................... 242/242; 242/277

(58) Field of Classification Search ................ 242/242, 242/278, 277
See application file for complete search history.

(56) References Cited

U.S. PATENT DOCUMENTS

| | | | |
|---|---|---|---|
| 3,084,885 A | | 4/1963 | Hornbostel |
| 3,094,296 A | * | 6/1963 | Nurmse ........................ 242/242 |
| 5,012,990 A | * | 5/1991 | Kawabe ....................... 242/242 |
| 5,167,381 A | * | 12/1992 | Henriksson et al. ........ 242/242 |
| 5,364,041 A | * | 11/1994 | Hitomi ........................ 242/242 |
| 5,921,489 A | * | 7/1999 | Shibata ........................ 242/242 |
| 6,170,773 B1 | * | 1/2001 | Okada ........................ 242/242 |
| 6,655,620 B2 | * | 12/2003 | Huat ............................ 242/242 |
| 6,742,736 B2 | * | 6/2004 | Gruber et al. .............. 242/249 |
| 6,843,438 B1 | * | 1/2005 | Yuen et al. .................. 242/242 |
| 6,874,717 B2 | * | 4/2005 | Takikura et al. ............ 242/242 |

FOREIGN PATENT DOCUMENTS

| | | |
|---|---|---|
| DE | 9300584 U1 | 3/1993 |
| EP | 1510126 A | 3/2005 |
| JP | 2000-175599 A | 6/2000 |

* cited by examiner

*Primary Examiner*—Emmanuel M Marcelo
(74) *Attorney, Agent, or Firm*—Global IP Counselors, LLP (57) ABSTRACT

An oscillation device axially oscillates a spool with handle rotation, and includes a driving gear, a cam gear, a slider, and a guiding portion. The driving gear is arranged on a master gear shaft, so as to be spaced apart from the master gear. The cam gear has a cam pin on its side surface, and is arranged on the fishing rod attachment side of the oscillation device relative to the master gear shaft. The cam gear is attached to the reel unit rotatably about an axis substantially parallel to the master gear shaft, so as to rotate in cooperation with the driving gear. The slider has a cam receiving portion engaging with the cam pin of the cam gear, and is axially immovably attached to the rear of the spool shaft. The guiding portion is provided in the reel unit and guides the slider movably in the axial direction.

20 Claims, 11 Drawing Sheets

SPINNING-REEL OSCILLATING DEVICE

BACKGROUND OF THE INVENTION

1. Field of the Invention

The present invention relates to an oscillating device. Particularly, the present invention relates to a spinning-reel oscillating device for axially oscillating a spool on which a fishing line is wound by a rotor, which is rotatably attached to a reel unit of a spinning reel fastened to a fishing rod, in cooperation with handle rotation via a spool shaft.

2. Background Information

A spinning reel includes an oscillating device for oscillating a spool axially in cooperation with handle rotation. With this type of oscillating device, it is known to employ a reduction gear system that shifts a slider with a rotary shaft, and a transverse cam system that shifts a slider with a threaded shaft arranged parallel to a spool shaft.

A conventional reduction gear oscillating device includes a driving gear formed unitarily with a master gear shaft to which a handle is attached, a cam gear that has a cam and meshes with the driving gear, and a slider that has a cam receiving portion which engages with the cam and is non-rotatably attached to the rear end of a spool shaft. The cam gear is arranged rearward and downward of the driving gear (the side opposite to the fishing rod attachment side), and is rotatably supported by a reel unit. The slider is supported movably in the axial direction by the reel unit (for example, see Japanese unexamined patent application 2000-175599).

With an oscillating device of this construction, the rotation of the handle is transmitted to the cam gear through the driving gear, and the slider is moved back and forth by the rotation of the cam gear. Thus, the spool is oscillated in the axial direction through the spool shaft.

In the above conventional construction, since the cam gear is arranged rearward and downward of the driving gear, the center of gravity of the reel as a whole is positioned away from a fishing rod. Accordingly, this increases the load that a user feels during casting. In addition, since the thickness of the lower part of the reel unit becomes thick, it is difficult to achieve a compact reel unit.

In view of the above, it will be apparent to those skilled in the art from this disclosure that there exists a need for an improved oscillating device that overcomes the problems of the conventional art. This invention addresses this need in the art as well as other needs, which will become apparent to those skilled in the art from this disclosure.

SUMMARY OF THE INVENTION

It is an object of the present invention to provide a reduction gear oscillating device that reduces the load the user feels, and also to reduce the thickness of the lower part of the reel unit.

A spinning-reel oscillating device according to a first aspect of the present invention. The handle rotation is transmitted to a master gear that is attached to a master gear shaft for rotating the rotor in cooperation with the handle rotation. The fishing line is adapted to be wound on the spool by the rotor rotatably attached to a reel unit. The spinning reel is adapted to be attached to a fishing rod. The spinning-reel oscillating device includes a driving gear, a cam gear, a slider and a guiding portion. The driving gear is adapted to be arranged on the master gear shaft so as to be spaced apart from the master gear that is attached to the master gear shaft. The cam gear has a cam on its side surface and is arranged on a fishing rod attachment side within the spinning-reel oscillating device relative to the master gear shaft. The cam gear is adapted to be attached to the reel unit so as to be rotatable about a first shaft in cooperation with the driving gear, the first shaft being substantially parallel to the master gear shaft. The slider has a cam receiving portion formed to engage with the cam of the cam gear. The slider is attached to the rear of the spool shaft such that the spool shaft and the slider are relatively immovable at least in the axial direction. The guiding portion is provided in the reel unit and formed to guide the slider such that the slider is movable in the axial direction relative to the guiding portion.

In this oscillating device, the driving gear rotates as a result of turning the handle, thus the cam gear rotates in cooperation with the rotation of the driving gear. When the cam gear rotates, engagement between the cam and the cam receiving portion oscillates the slider in the axial direction. Thus, the spool is oscillated in the axial direction through the spool shaft. Furthermore, since the cam gear is arranged to be closer to the fishing rod attachment side than the master gear shaft provided with the driving gear is, the cam gear is positioned to be closer to a fishing rod. Accordingly, the center of gravity of the reel shifts to be closer to the fishing rod attachment side than a conventional spinning reel. This can reduce the load that the fisherman user feels. Furthermore, since the cam gear is arranged on the fishing rod attachment side, it is possible to reduce the thickness of the opposite side, i.e., the lower side of the reel unit.

A spinning-reel oscillating device according to a second aspect of the present invention is the spinning-reel oscillating device according to the first aspect of the present invention, further including an intermediate gear attached to the reel unit so as to be about a second shaft that is substantially parallel to the master gear shaft. The intermediate gear includes a first gear that meshes with the driving gear and has more teeth than the driving gear does, and a second gear that is arranged concentrically with the first gear, meshes with the cam gear, and has fewer teeth than the cam gear does. In this case, since it is possible to gear down between the driving gear and the first gear, and between the second gear and the cam gear respectively, the speed of the axial movement can be low relative to the rotation of the rotor. Therefore, in the reduction gear oscillating device, the fishing line can be wound closely onto the spool.

A spinning-reel oscillating device according to a third aspect of the present invention is the spinning-reel oscillating device according to the second aspect of the present invention, in which the second shaft is arranged on the fishing rod attachment side relative to the first shaft. In this case, since a stepped gear should be arranged on the fishing rod attachment side relative to the cam gear, even when the stepped gear is provided, this does not increase the load that the fisherman feels so much. In addition, it is possible to reduce the thickness of the lower part of the reel unit.

According to a spinning-reel oscillating device of a fourth aspect of the present invention, is the spinning-reel oscillating device according to the second or third aspect of the present invention, in which the driving gear and the first gear are circular gears, and the second gear and the cam gear are non-circular gears. In this case, the uniform velocity rotation of the second gear can be converted into the non-uniform velocity rotation of the cam gear by the non-circular gears, thus, the movement of the slider can be brought close to a uniform velocity rectilinear motion.

A spinning-reel oscillating device according to a fifth aspect of the present invention is the spinning-reel oscillating device according to any of the first to fourth aspects of the present invention, the cam receiving portion is arranged on the fishing rod attachment side relative to the spool shaft. In this case, the cam receiving portion is arranged upward relative to the spool shaft. Thus, the slider can be arranged between the master gear and the driving gear. Therefore, it is possible to reduce the thickness of the entire reel unit.

A spinning-reel oscillating device according to a sixth aspect of the present invention is the spinning-reel oscillating device of any of the first to fifth aspects of the present invention, in which the cam receiving portion is arranged closer to the master gear than the spool shaft is. In this case, the cam receiving portion is arranged closer to the master gear than the spool shaft is. Thus, the slider can be arranged between the spool and the master gear. Therefore, it is possible to reduce the thickness of the entire reel unit.

A spinning-reel oscillating device according to a seventh aspect of the present invention is the spinning-reel oscillating device of any of the first to sixth aspects of the present invention, in which the guiding portion includes two guiding shafts that are arranged substantially in parallel to the spool shaft and support the slider on the fishing rod attachment side and the opposite side. In this case, the stroke can be increased as compared with the case where a cam groove is formed linearly in the up-and-down direction. Since the slider is guided by the two guiding shafts, the slider can move smoothly in the axial direction.

A spinning-reel oscillating device according to an eighth aspect of the present invention is the spinning-reel oscillating device of any of the first to seventh aspects of the present invention, in which the cam includes a cam pin formed to protrude toward the slider, and the cam receiving portion includes a cam groove that is formed to engage with the cam pin and to extend diagonally such that a fishing rod attachment side end of the cam groove is positioned forward relative to an opposite side end of the cam groove.

In this case, when the slider moves forward and approaches the master gear shaft, the slider can easily go around the master gear shaft. Therefore, it is possible to reduce the entire axial length of the reel, and make the stroke longer than the rotational diameter of the cam pin.

A spinning-reel oscillating device according to a ninth aspect of the present invention is the spinning-reel oscillating device according to the eighth of the present invention, in which the cam groove further includes a curved portion curved convexly forward from the fishing rod attachment end of the cam groove, a first linear portion formed linearly and diagonally rearward from the curved portion, and a second linear portion extending linearly from the opposite side end toward the fishing rod attachment side end of the cam groove. In this case, when moving forward and approaching the master gear shaft, the slider can easily go around the master gear shaft. Therefore, it is possible to reduce the entire axial length of the reel, and the uniform velocity rotation of the driving gear can be converted into a non-uniform velocity rotation of the cam gear when the spool moves forward and rearward through the curved portion. Thus, the movement of the slider can be brought close to a uniform velocity rectilinear motion.

A spinning-reel oscillating device according to a tenth aspect of the present invention is the spinning-reel oscillating device according to the eighth of the present invention, in which the cam groove extends linearly between the fishing rod attachment side end and the opposite side end.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Overall Configuration

Figure 1:
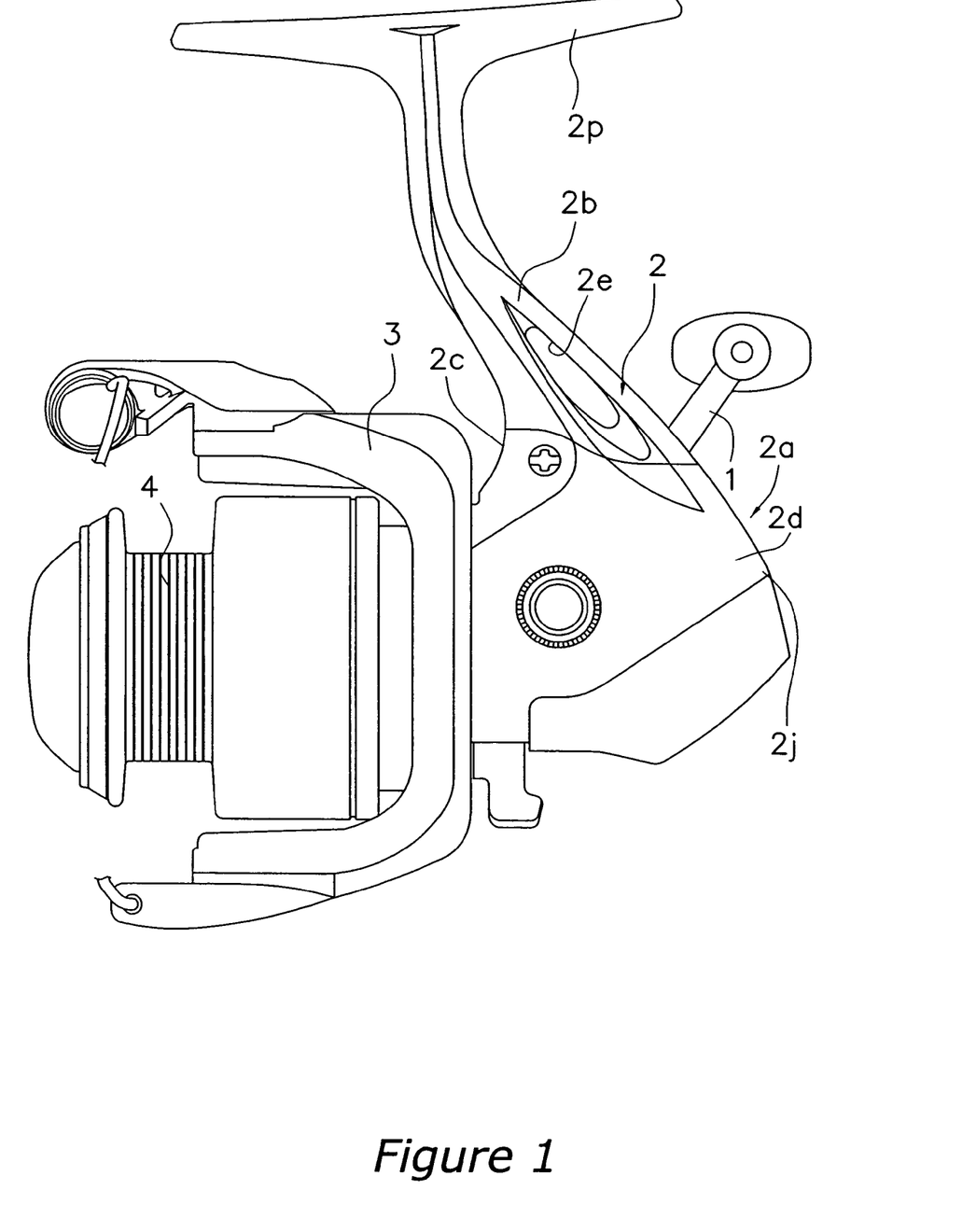
FIG. 1 is a side view of a spinning reel in accordance with an embodiment of the present invention.

With reference to FIG. 1, a spinning reel according to a first embodiment of the present invention is a front-drag type spinning reel that wind a fishing line around the axis X that extends along the longitudinal direction of a fishing rod. The spinning reel is furnished with a reel unit 2 having a handle 1; a rotor 3 supported rotatably around the axial center in the front of the reel unit 2; and a spool 4 disposed on the front of the rotor 3 onto which the fishing line is wound.

Figure 2:
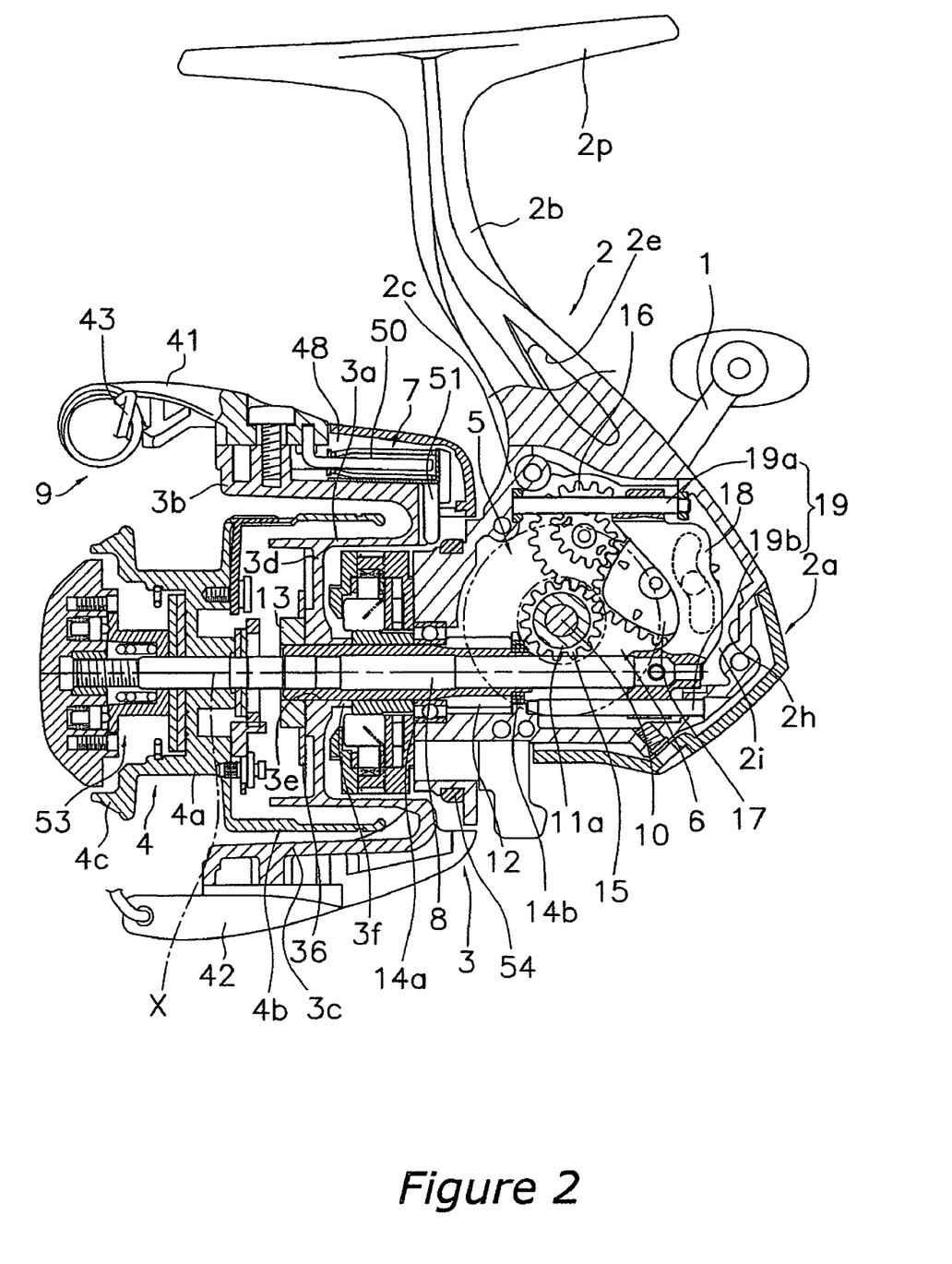
FIG. 2 is a cross-sectional view of the side of the spinning reel in accordance with the embodiment of the present invention.
Figure 6:
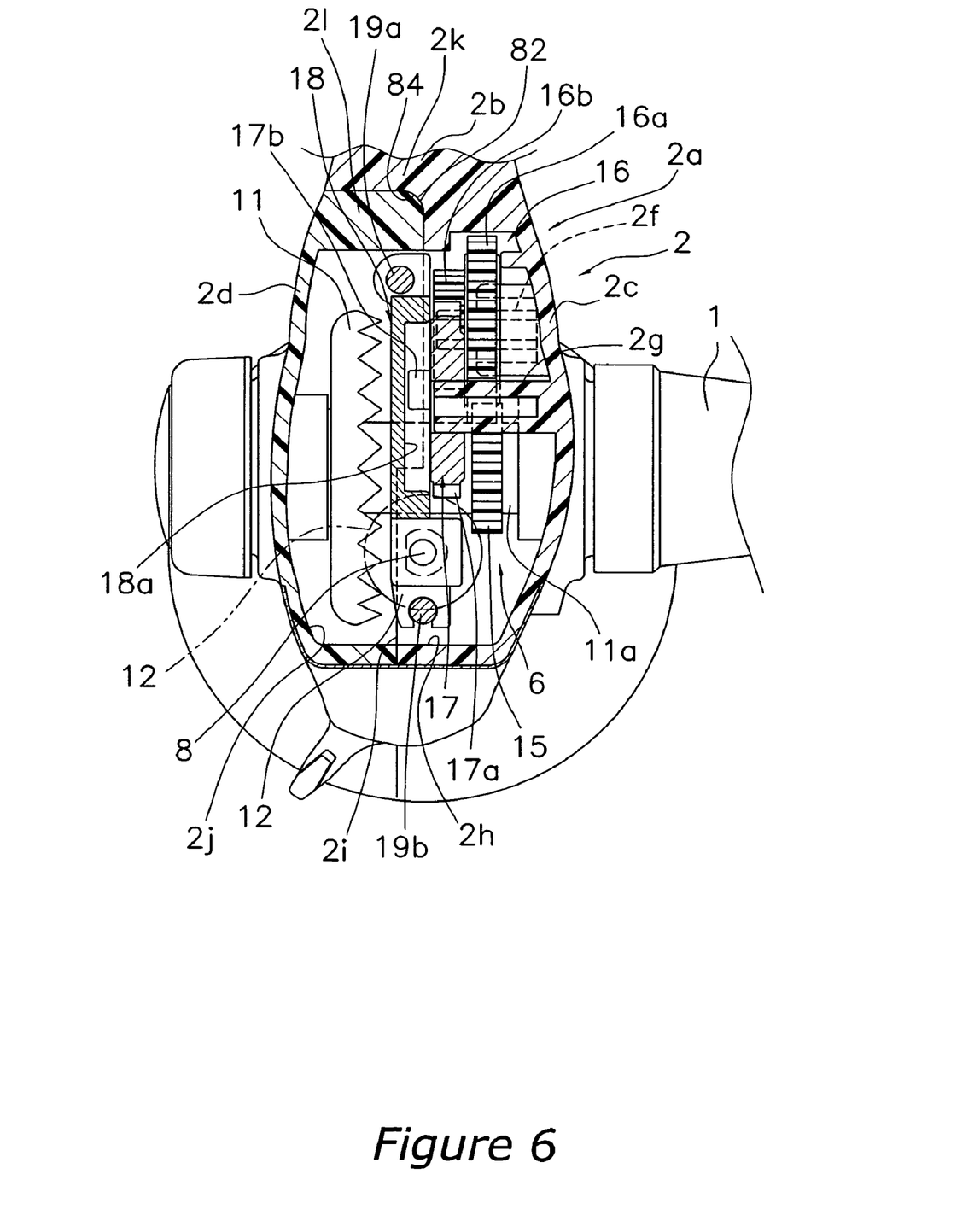
FIG. 6 is a transverse cross-sectional view the oscillating mechanism in accordance with the embodiment of the present invention.
Figure 7:
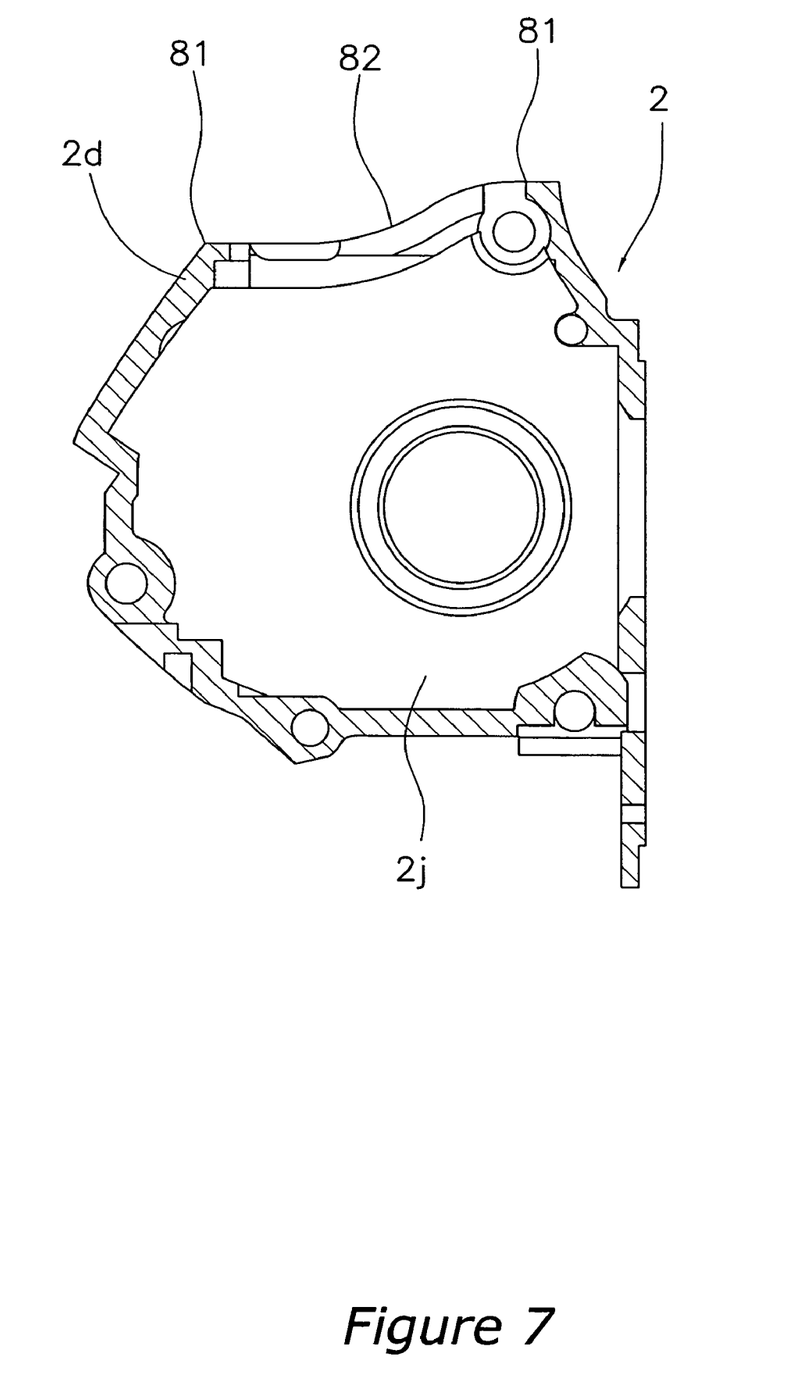
FIG. 7 is an enlarged lateral cross-sectional view of a lid member in accordance with the embodiment of the present invention as seen from the inside.
Figure 8:
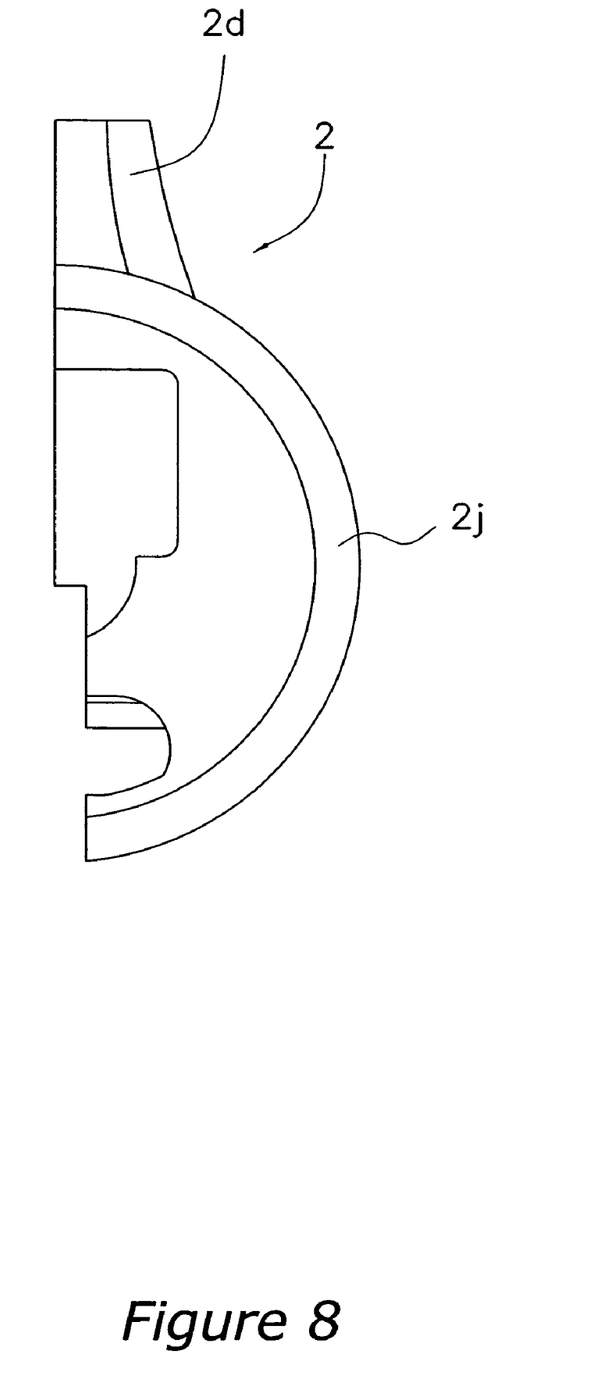
FIG. 8 is an enlarged front view of the lid member in accordance with the embodiment of the present invention.

The reel unit 2 is made of metal or synthetic resin, for example. The reel unit 2 includes a T-shaped rod attachment leg 2b that has a rod attachment portion 2p and a reel body 2a connected to the rod attachment leg 2b, as shown in FIGS. 1 and 2. The rod attachment portion 2p is long in the axial direction and is mounted to a fishing rod. The reel body 2a includes a body member 2c that is formed unitarily with the rod attachment leg 2b, and a lid member 2d that is detachably attached to the body member 2c, as shown in FIGS. 1, 2, and 6. The rod attachment leg 2b is provided with a through hole 2e that has a longitudinal shape and passes through the sides thereof on the lower part.

Figure 5:
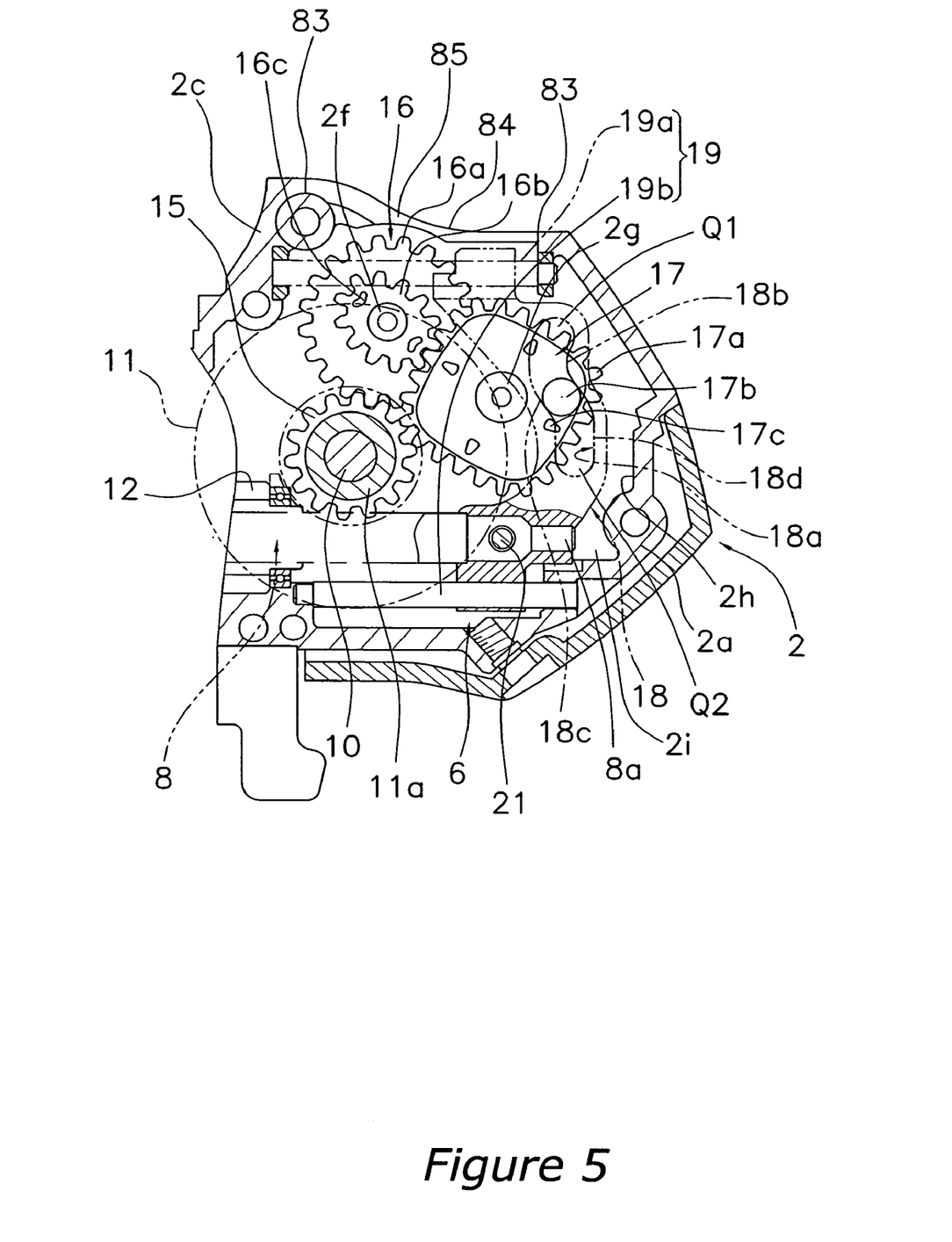
FIG. 5 is an enlarged cross-sectional view of an oscillating mechanism in accordance with the embodiment of the present invention.

The body member 2c has an accommodation space 2h that is provided with an opening 2i opening on the side thereof as shown in FIGS. 2, 5, and 6. A rotor drive mechanism 5 for rotating the rotor 3, and an oscillating mechanism 6 for oscillating axially in cooperation with rotation of the rotor 3 are provided inside the accommodation space 2h. A stepped portion 2k that is recessed on the accommodation space 2h side is formed in the connection part of the upper part of the accommodation space 2h on the rod attachment leg 2b side in the body member 2c.

As shown in FIGS. 1, 6 to 8, the lid member 2d covers the opening 2i of the body member 2c, and includes a cover-shaped closing portion 2j that accommodates a part of the rotor drive mechanism 5. The lid member 2d has an end portion 21 that protrude upward in the connection part on the rod attachment leg 2b side of the closing portion 2j. The end portion 21 of the lid member 2d is attached such that its outline engages with the stepped portion 2k of the body member 2c.

The end portion 21 of the lid member 2d has a first corner 81 (see FIG. 10) that is exposed externally, and a second corner 82 (see FIGS. 6 and 9) that is hardly exposed externally.

Figure 10:
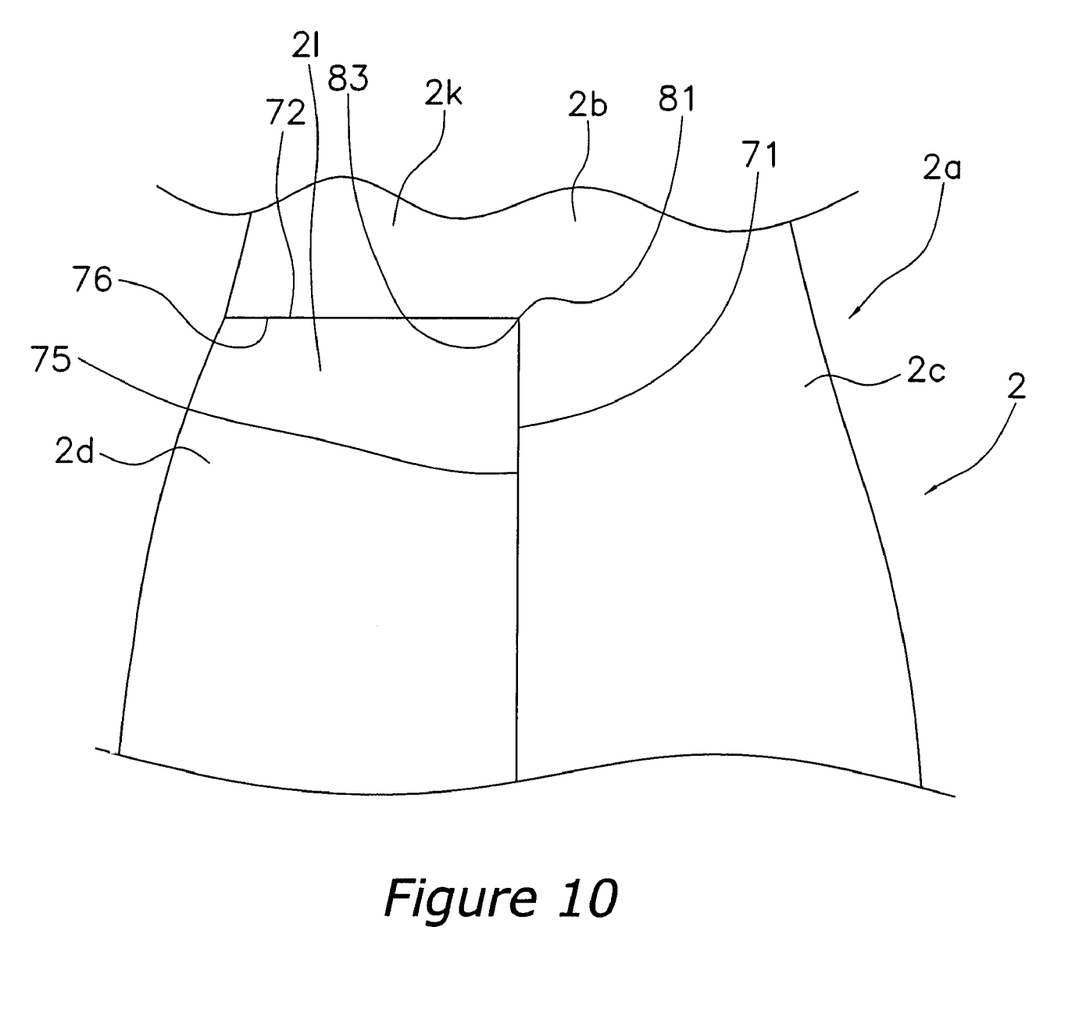
FIG. 10 is an enlarged rear view of the conjunction portion of the body member and the lid member in accordance with the embodiment of the present invention.

The first corner 81 is a corner that is the intersection of a first junction portion 71 and a second junction portion 72, as shown in FIG. 10. The first junction portion 71 extends from the closing portion 2j of the lid member 2d to the rod attachment leg 2b side. The second junction portion 72 is perpendicular to the upper end of the first junction portion 71, and extends outward. The first corner 81 is formed such that its junction surface with a third corner described later is a flat surface.

Figure 9:
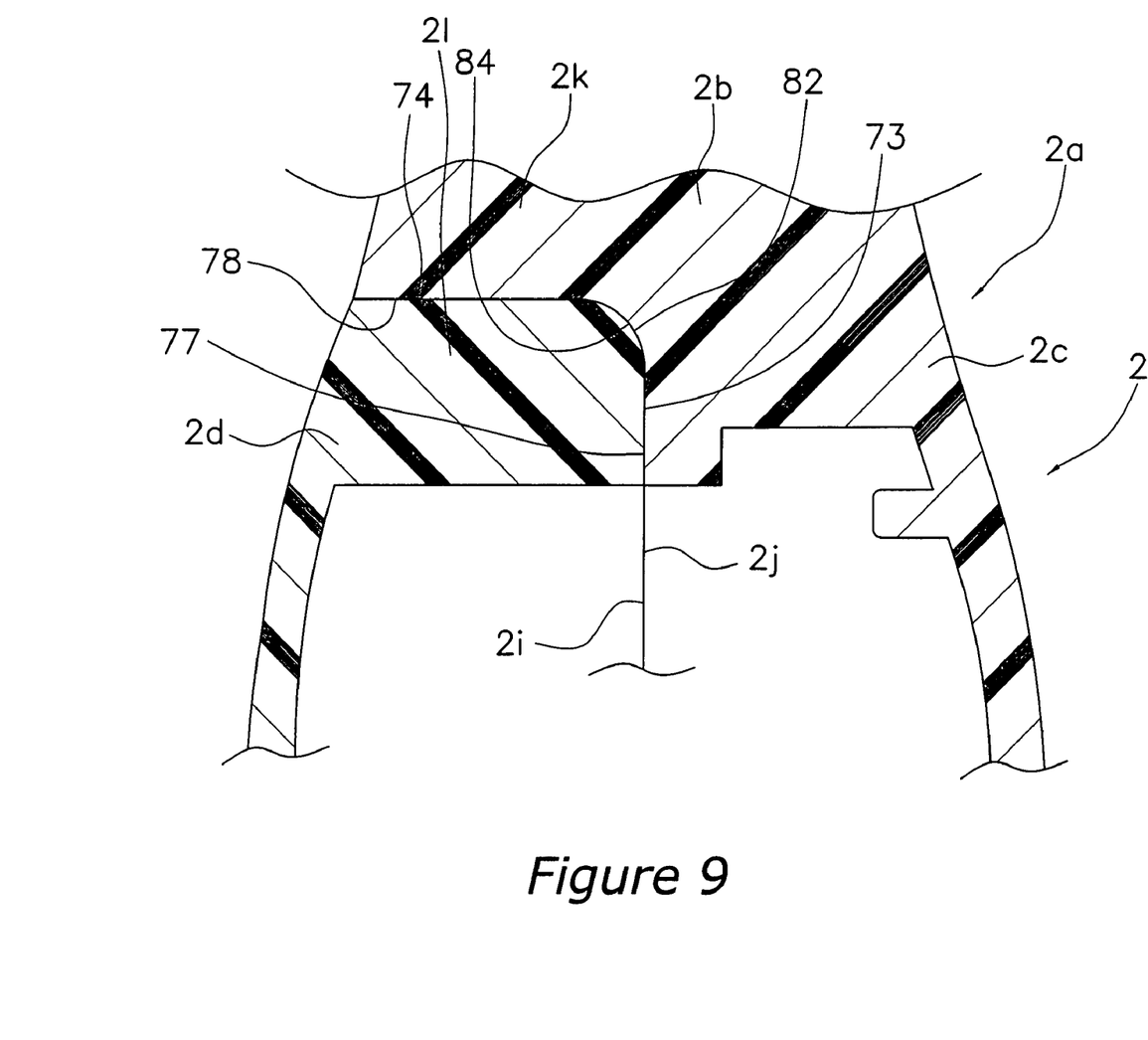
FIG. 9 is an enlarged cross-sectional rear view of the conjunction portion of the body member and the lid member in accordance with the embodiment of the present invention.

The second corner 82 is a substantially arc-shaped corner that connects the third junction portion 73 and a fourth junction portion 74, as shown in FIG. 9. The first portion 73 extends from the closing portion 2j of the lid member 2d to the rod attachment leg 2b side. The fourth junction portion 74 is perpendicular to the upper end of the third junction portion 73, and extends outward. The second corner 82 is formed as a curved surface such that its junction surface with a fourth corner 84 (see FIG. 9) described later is a rounded surface by rounding.

The stepped portion 2k of the body member 2c has a third corner 83 (see FIG. 10) that is exposed externally, and the fourth corner 84 (see FIGS. 6 and 9) that is hardly exposed externally.

The third corner 83 is a corner that is the intersection of a fifth junction portion 75 and a sixth junction portion 76, as shown in FIG. 10. The fifth junction portion 75 extends from the opening 2i of the body member 2c to the rod attachment leg 2b side. The sixth junction portion 76 is perpendicular to the upper end of the fifth junction portion 75, and extends outward. The third corner 83 is formed such that the junction surfaces with the first corner 81 are flat surfaces. Thus, the first corner 81 and third corner 83 that are exposed externally are joined to each other on the flat surfaces.

Figure 11:
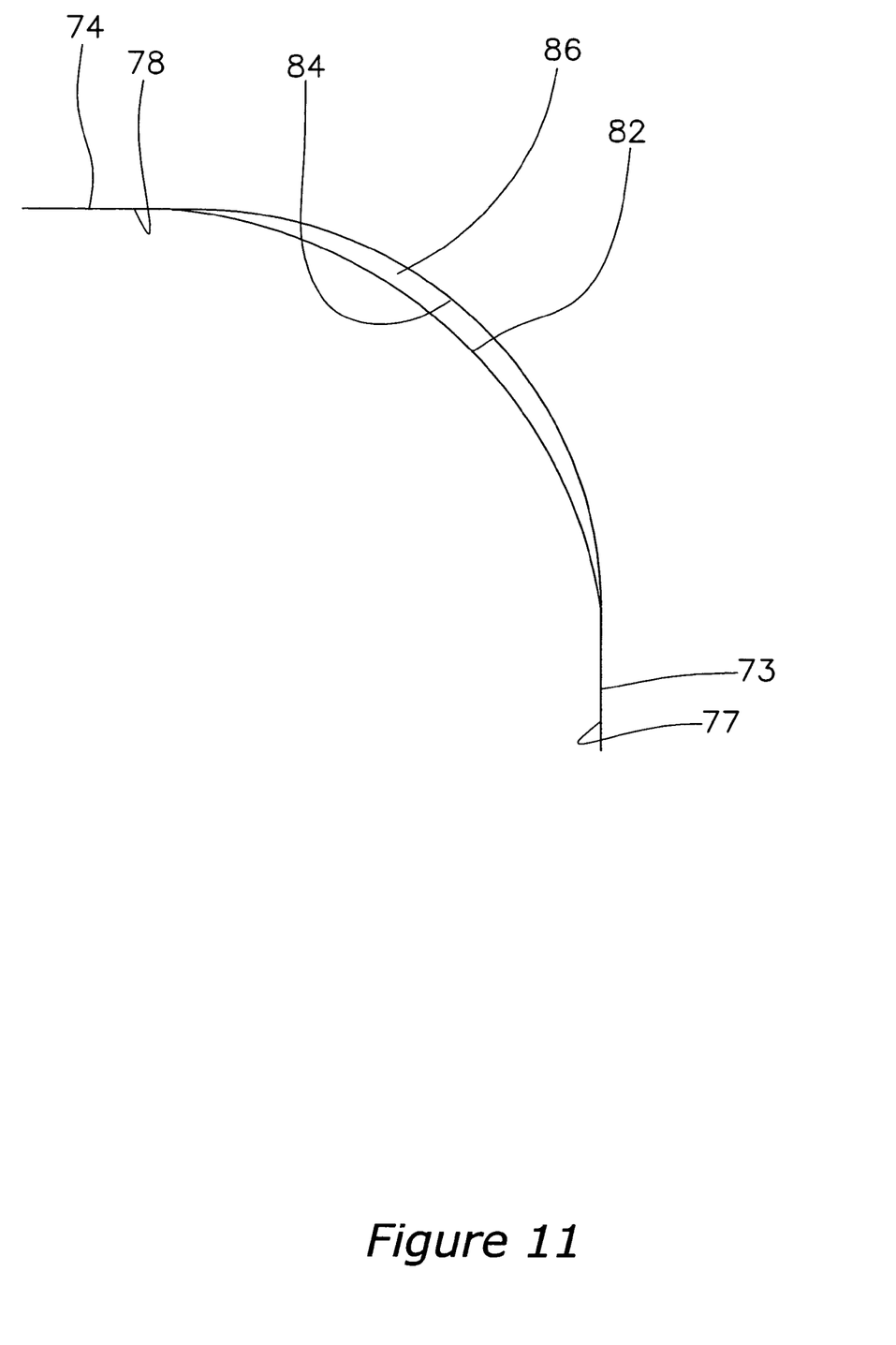
FIG. 11 is an enlarged schematic view of the conjunction portion of the body member and the lid member in accordance with the embodiment of the present invention.

The fourth corner 84 is a substantially arc-shaped corner that connects a seventh junction portion 77 and an eighth junction portion 78, as shown in FIG. 9. The seventh portion 77 extends from the opening 2i of the body member 2c to the rod attachment leg 2b side. The eighth junction portion 78 is perpendicular to the upper end of the seventh junction portion 77, and extends outward. The fourth corner 84 is formed as a curved surface such that its junction surface with the second corner is a rounded surface by rounding. As shown in an enlarged view of FIG. 11, the radius of the fourth corner 84 is greater than the second corner 82, thus, a small gap 86 is formed between the second corner 82 and the fourth corner 84. In addition, as shown in FIG. 5, the fourth corner 84 is provided with a cut-off portion 85 that is formed by cutting off a part thereof on the opening side 2i of the body member 2c. In the case where the above cut-off portion 85 is formed, it is possible to achieve weight reduction of the body member 2c, and to ensure to make the interior of the accommodation space 2h large.

As shown in FIGS. 1 and 2, the rotor 3 is, for example, made of synthetic resin or metal, and is rotatably supported by the reel unit 2. As shown in FIG. 2, the rotor 3 includes a cylindrical portion 3a, and a first arm 3b and second arm 3b which are arranged opposite each other on the sides of the cylindrical portion 3a. A boss 3f with a through hole 3e is formed in the central portion of the front wall 3d of the cylindrical portion 3a. The spool shaft 3 and a later-described pinion gear 12 pass through the through hole 3e. A bail arm 9 is arranged on the fore ends of the first and second arms 3b and 3c so as to be pivotable between a line-retrieving posture and a line-releasing posture. The fishing line is guided onto the spool 4 by means of the bail arm 9.

The bail arm 9 includes first and second bail members 41 and 42, and a bail 43 that connects them. The first and second bail support members 41 and 42 are mounted pivotably to the fore ends of the first and second arms 3b and 3c, respectively.

The bail arm 9 is configured to be returned from the line-releasing posture to the line-retrieving posture by a bail tripping mechanism 7 that is mounted to the first rotor arm 3b, in cooperation with the rotation of the rotor in the line-retrieving direction. The bail tripping mechanism 7 is disposed in the accommodation space 48 of the first arm 3b. The bail tripping mechanism 7 restores the bail arm 9 from the line-release position to the line-winding position when the rotor 3 is rotated, and maintains the bail arm 9 in these two positions. In addition, when the bail arm 9 is disposed in the line-releasing posture, bail tripping mechanism 7 also serves to control the rotation of rotor 3.

Figure 3:
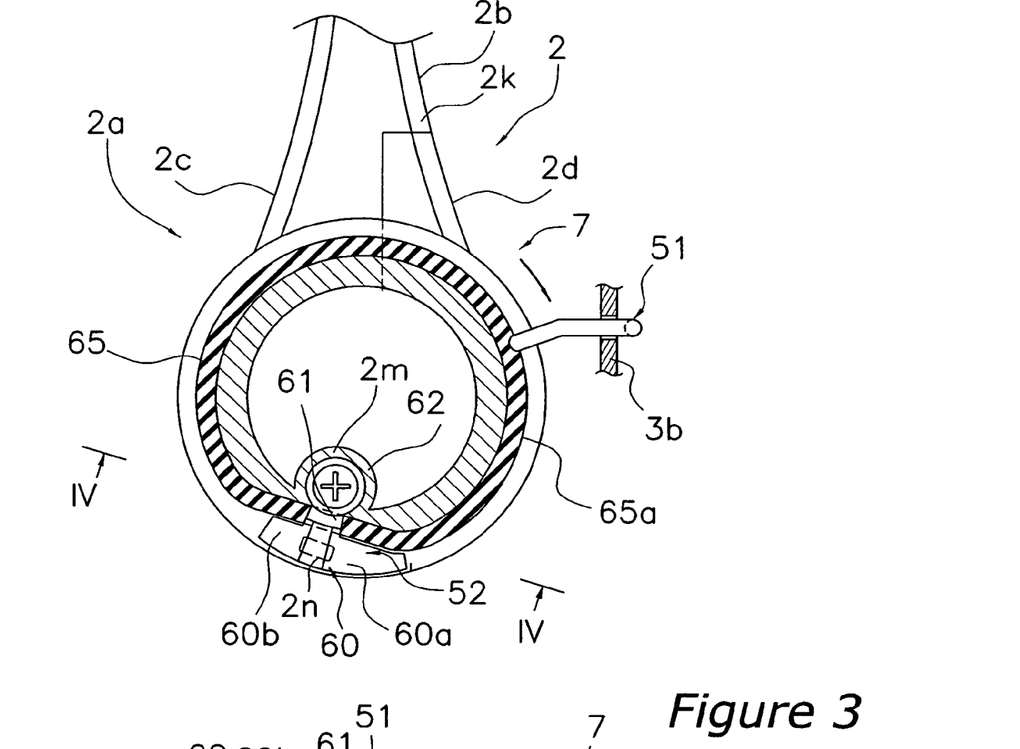
FIG. 3 is an enlarged cross-sectional view of a bail tripping mechanism of the spinning reel in accordance with the embodiment of the present invention.
Figure 4:
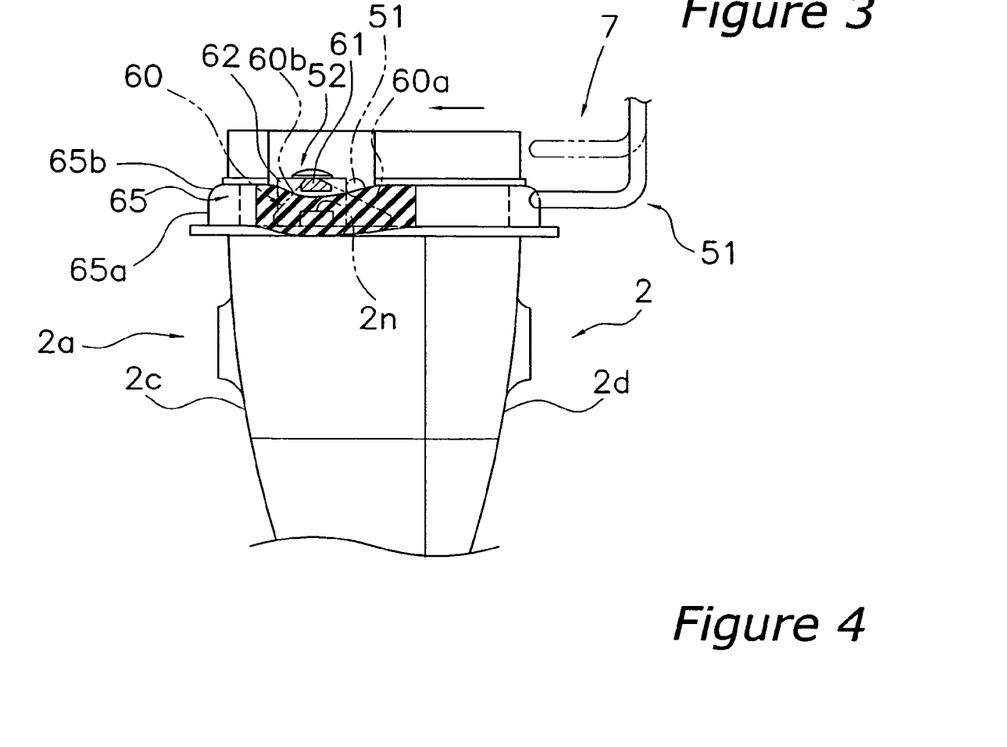
FIG. 4 is a cross-sectional view of the bail tripping mechanism of the spinning in accordance with the embodiment of the present invention reel viewed along the IV-IV line in FIG. 3.

As shown in FIGS. 2 to 4, the bail tripping mechanism 7 includes a toggle spring mechanism 50, a shifting member 51, a switching member 52 (see FIG. 3), and a braking member 65 for braking the rotor 3. The toggle spring mechanism 50 is disposed within the accommodation space 48 and pivotably attached to the first arm 3b. The shifting member 51 is also disposed in the accommodation space 48 and can be oscillated in the substantially axial direction. The switching member 52 is mounted detachably on the fore end of the reel body 2a, such that it can contact the shifting member 51.

The toggle spring mechanism 50 toggles and biases the bail arm 9 into the line-releasing posture and the line-retrieving posture. The moving member 51 is a rod shaped member. Its fore end is engaged with the first bail support member 41. Its rear end is arranged to be opposed to the front of reel body 2a. The moving member 51 is moved forward and rearward when the bail arm 9 is pivoted. Specifically, with the moving member 51, its rear end is arranged in the forward position where it cannot be in contact with the switching member 52 and the braking member 65 when the bail arm 9 is in the line-retrieving posture, on the other hand, its rear end is arranged in the state that it can be in contact with the switching member 52 and is in contact with the braking member 65 when the bail arm 9 is in the line-releasing posture. This moving member 51 comes in contact with the switching member 52, and is moved to the forward position from the rearward position, thus, the bail arm 9 returns from the line-releasing posture to the line-retrieving posture.

The switching member 52, which is a component made of a synthetic polymer such as a synthetic polyamide resin or polyacetal for example, as shown in FIGS. 3 and 4, is detachably mounted on a mounting boss 2m that is formed on the front of the reel body 2a with a screw. The switching member 52 includes a roughly triangular cam portion 60 having two oblique surfaces 60a and 60b, an arch portion 61 extending from the cam portion 60 to the center side, and a cylindrical attachment portion 62 screwed to the mounting boss 2m. The downstream side in the line-retrieving direction (shown by the arrow in FIG. 4) of the oblique surface 60a projects forward toward the rotor 3 more than the upstream side thereof does. The amount that the oblique surface 60b projects toward the downstream side in the line-retrieving direction is less than that of the oblique surface 60a. A projecting tip is the highest forward projecting point of the oblique surfaces 60a, 60b, and the amount that it projects forward is set such that it exceeds the dead point of the toggle spring mechanism 50 when the rear end portion of the moving member 51 contacts the oblique surface 60a and pushes the bail arm 9 toward the line-retrieving position. In addition, a recessed portion, which fits in positioning protrusion 2n formed to protrude from the front surface of reel body 2a, is formed on the bottom, which comes in contact with the reel body 2a of the cam portion 60, such that the screwed switching member 52 is positioned and locked.

The arch portion 61 has a cut-off shape that allows the braking member 65 to pass between the front surface of reel body 2a and the arch portion 61. The attachment portion 62 is a cylindrical-shaped member and is secured to the mounting boss 2m of the reel body 2a with a screw.

The braking member 65 is provided in order to brake the rotation of the rotor 3 when the bail arm 9 is in the line-releasing posture. The braking member 65 is a ring-shaped member made of synthetic rubber as an elastic substance. The braking face 65a, consisting of a flat circumferential surface except in a section that avoids the switching portion 52, is formed on along the outer periphery of the braking member 65. The braking member 65 is mounted to the fore of the cross-sectionally D-shaped reel body 2a. Consequently, the braking member 65 is mounted in D-shape when viewed head on. The linear portion of the braking member 65 is rearwardly curved and goes around the rear of the arch portion 61 of the switching member 52 as shown in FIG. 4. The braking member 65 is curved and goes around the rear side of the switching member 52 toward the inside as mentioned above, thus, the braking member 65 can be provided while limited space is effectively used.

At the fore-end rim of the braking face 65a of the braking member 65 a piloting surface 65b is formed in continuity with the braking face 65a. The piloting surface 65b is formed such that the upstream end in the shifting direction of moving member 51 linked with pivoting into the line-releasing posture is more remote from the moving member 51 than the downstream end is, and in this embodiment is lent roundness formed into a circular surface in continuity with the braking face 65a. In this embodiment, the guiding surface 65b is formed as a rounded surface that is rounded in continuation with the braking surface 65a. Forming such an oblique guiding surface 65b in continuation with the braking surface 65a, the rounded rear end of the shifting member 51 contacts the guiding surface 65b of the braking member 65 first before it smoothly contacts the braking surface 65a. Therefore, the switching of the bail arm 9 between postures is made smooth.

The spool 4 is a member made of metal or synthetic resin, and is disposed between the first arm 3b and the second arm 3c of the rotor 3 as shown in FIG. 2. The spool is rotatably mounted to the fore end of the spool shaft 8 that extends from the front to the rear along the axis X through a drag mechanism 53. The spool 4 has a cylindrical bobbin 4a around which the fishing line is wound, a large-diameter cylindrical skirt 4b unitarily formed with the rear end of the bobbin 4a, and a large-diameter front flange 4c unitarily formed with the front end of the bobbin 4a.

The rotor drive mechanism 5 includes a master gear 11 that has a master gear shaft 11a rotating together with a handle shaft 10 onto which the handle 1 is fixed, and a pinion gear 12 that meshes with the master gear 11. The master gear shaft 11a is rotatably supported by the reel unit 2. The pinion gear 12 is formed in a tubular shape, and the spool shaft 8 passes through the center thereof. A front portion of the pinion gear 12 passes through the through hole 3e of the rotor 3 and extends toward the spool 4. The rotor 3 is non-rotatably fastened to the pinion gear 12 at the front portion 12a by a nut 13. The pinion gear 12 is rotatably supported on the reel unit 2 by bearings 14a and 14b at the front and the middle. The nut 13 is locked by means of a retainer 36. The retainer 36 is fastened with a screw screwed into a screw hole formed on the front wall 3d.

Configuration of the Oscillating Mechanism

The oscillating mechanism 6 is, as shown in FIG. 2, a device that oscillates a spool shaft 8 fixedly coupled to the center of the spool 4 in the axial direction, and oscillates the spool 4 in the same direction. The oscillating device 6 includes a driving gear 15, an intermediate gear unit 16, a cam gear unit 17, a slider 18, and a guiding portion 19. The driving gear 15 is arranged on the master gear shaft 11a. The intermediate gear unit 16 meshes with the driving gear 15. The cam gear unit 17 rotates in cooperation with the driving gear 15 through the intermediate gear unit 16. The slider 18 engages with the cam gear unit 17, and is non-rotatably and immovably secured to the rear end of the spool shaft 8. The slider 18 is axially oscillated by engagement with the cam gear unit 17. The guiding portion 19 is provided in the reel body 2a, and guides the slider 18 such that the slider 18 can be axially oscillated.

As shown in FIGS. 5 and 6, the driving gear 15 is a circular gear such as a spur gear or helical gear with fourteen teeth, and is formed unitarily with the master gear shaft 11a so as to be spaced at an interval from the master gear 11. The driving gear 15 may be formed separately from the master gear shaft 11a.

The intermediate gear unit 16 is a disc-shaped member, and is mounted to the reel body 2a rotatably about an axis that is parallel to the master gear shaft 11a. More specifically, the intermediate gear unit 16 is rotatably mounted to an attachment shaft 2f, which protrudes from the interior wall surface in parallel to a master gear shaft 11a as shown in FIG. 6. As shown in FIG. 5, the attachment shaft 2f is arranged on the rear side relative to the master gear shaft 11a (rightward in FIG. 5) and on the side that is closer to the rod attachment portion 2p (upward in FIG. 5). The intermediate gear unit 16 includes a first gear 16a that meshes with the driving gear 15, and a second gear 16b that is arranged concentrically with the first gear 16a. The number of the teeth in the first circular gear 16a is greater than that of the driving gear 15. The first gear 16a is a spur gear or helical gear with twenty-two teeth, for example. The second gear 16*b* is a non-circular gear such as a bi-lobe elliptic gear having twelve teeth, for example. The first gear 16*a* and the second gear 16*b* can be formed unitarily or separately. In addition, they may be spaced from each other, or may be in contact with each other. In addition, two marks 16*c* drawn on the side surface of the second gear 16*b* in FIG. 5 show the position corresponding to the maximum tip diameter.

The cam gear unit 17 is a disc-shaped member, and is mounted to the reel body 2*a* rotatably about an axis that is parallel to the intermediate gear unit 16. More specifically, the rotary cam 16 is rotatably mounted to an attachment shaft 2*g*, (an example of the first shaft) which protrudes from the interior wall surface in parallel to a master gear shaft 11*a* as shown in FIG. 6. As shown in FIG. 5, the attachment shaft 2*g* is arranged on the rear side (right hand side in FIG. 5) relative to the attachment shaft 2*f*, on the side that is farther away from the rod attachment portion 2*p* (downward in FIG. 5) than the attachment shaft 2*f* is, and on the side that is closer to the rod attachment portion 2*p* (upward in FIG. 5) than the master gear 11*a* is. As a result, in terms of the arrangement in the upward-and-downward direction, the attachment shaft 2*g* is arranged between the master gear 11*a* and the attachment shaft 2*f*. In terms of the arrangement in the front-and-rear direction, the attachment shaft 2*f* is arranged between the master gear 11*a* and the attachment shaft 2*g*.

The cam gear unit 17 includes a gear portion 17*a* formed on the outer periphery thereof, and a columnar cam pin 17*b* protruding in an axial direction that is parallel to the master gear shaft 11*a*. The number of teeth of the gear portion 17*a* is greater than that of the second gear 16*b*. The gear portion 17*a* is a quad-lobe non-circular gear with twenty-four teeth, for example. The gear portion 17*a* is arranged such that a tooth corresponding to the maximum tip diameter of the gear portion 17*a* meshes with a tooth corresponding to the minimum tip diameter of the second gear 16*a*. In addition, four marks 17*c* drawn on the side surface of the cam gear unit 17 in FIG. 5 indicate the positions corresponding to the minimum tip diameter. Accordingly, the regular mesh is ensured by assembling the two of the second gear 16*b* and the gear portion 17*a* in alignment of the marks 16*c* and 17*c* with each other. This can provide an easy assembly task.

The slider 18 includes a cam receiving portion 18*a* that is formed in a penetrating cam groove engaging with the cam pin 17*b* and engages with the cam pin 17*b*, and is mounted to the reel body 2*a* so as to be oscillated in the axial direction of the spool shaft 8. The cam receiving portion 18*a* is arranged on the side that is closer to the rod attachment portion 2*p* than the spool shaft 8 is, and also on the side that is closer to the master gear 11. The rear end 8*a* of the spool shaft 8 is mounted to the slider 18 non-rotatably and immovably in the axial direction with a countersunk screw 21 that is screwed on the lower part of the slider 18. The rear end 8*a* of the spool shaft 8 secured to the slider 18 has a diameter smaller than other part. Accordingly, the attachment part of the slider 18, where the spool shaft 8 is attached to the slider 18, can be made smaller in size, and it is possible to reduce the interference between the slider 18 and the reel body 2*a* when the slider 18 is positioned at the rear end position. Therefore, it is possible to increase the degree of freedom of design of the rear end of the reel body 2*a*.

As shown in FIG. 5, the cam receiving portion 18*a* includes a cam groove that engages with the cam pin 17*b* and has a curved portion 18*b* curved convexly forward from a first end Q1 of the cam groove, a first linear portion 18*c* formed linearly and diagonally rearward from the curved portion 118*b*, and a second linear portion 18*d* extending linearly from the first end Q1 to a second end Q2 of the cam groove, and the first end Q1 on the fishing rod attachment side is positioned forward of the second end Q2 on the opposite side.

The guiding portion 19 is guided along the spool shaft in the axial direction by two guiding shafts 19*a* and 19*b* that are spaced at an interval and arranged at upper and lower positions to be parallel to each other in the reel body 2*a*.

In this case, since the cam gear 17 is arranged to be closer to the fishing rod attachment side than the master gear shaft 11*a* provided with the driving gear 15, the cam gear 17 is positioned to be closer to a fishing rod. Accordingly, the center of gravity of the reel shifts to be closer to the fishing rod attachment side than a conventional spinning reel. This can reduce the load that a user feels. Furthermore, since the cam gear is arranged on the fishing rod attachment side, it is possible to reduce the thickness of the opposite side, i.e., the lower side, of the reel unit.

Operation and Function of the Reel

When casting, the bail arm 9 is tripped into the line-releasing posture while holding the fishing line with user's index finger, and then casting is carried out.

When the fishing line is wound in, the bail arm 9 is tripped into the line-retrieving posture. In this state, rotating the handle 1 in the line-retrieving direction transmits the rotational force to the pinion gear 12 via the handle shaft 10 and the master gear 11. The rotational force transmitted to the pinion gear 12 is transmitted to the rotor 3 via the front portion 12*a* of the pinion gear 12.

When the master gear 11 rotates, the intermediate gear unit 16 rotates by the first gear 16*a* that meshes with the driving gear 15, and the cam gear unit 17 rotates by the mesh between the second gear 16*b* and the gear portion 17*a*. Thus, this rotation is transmitted to the slider 18 by the cam pin 17*b*. Consequently, the slider 18 oscillates along the axial center X of the spool shaft 8 forward and backward.

At this time, speed reduction is achieved between the driving gear 15 and the first gear 16*a*, and speed reduction is also achieved between the second gear 16*b* and the gear portion 17*a*. The rotation of the cam gear unit 17 is slower by greatly reducing the rotational speed of the handle 1 as compared with a conventional device. Accordingly, since the speed of oscillation of the spool 4 is slower, the fishing line can be tightly wound onto the spool 4. In addition, since the second gear 16*b* and the gear portion 17*a* are non-circular gears, uniform circular motion can be converted into non-uniform circular motion. Therefore, it is possible to suppress that the wound line shape is lost due to variation of the speed of oscillation of the spool 4 as compared with the case where a circular gear is employed.

With this reel unit, the first corner 81 of the end portion 21 of the lid member 2*d* that is exposed externally, and the third corner 83 of the stepped portion 2*k* of the body member 2*c* that is exposed externally are jointed to each other on the flat surfaces, thus, the body member 2*c* and the lid member 2*d* can be jointed to each other without a gap in an exterior appearance. In addition, a junction surface of the fourth corner 84 that is not exposed externally of the stepped portion 2*k* of the body member 2*c* is a curved surface. Thus, even when a large force acts on the connection part of the rod attachment leg 2*b* of the body member 2*c*, it is possible to keep problems due to stress concentrations in check.

OTHER EMBODIMENTS (a) In the foregoing embodiment, though the rotation of the handle 1 is greatly reduced by the intermediate gear unit, the present invention can be also applied to an oscillating device which does not use the intermediate gear unit.

Figure 12:
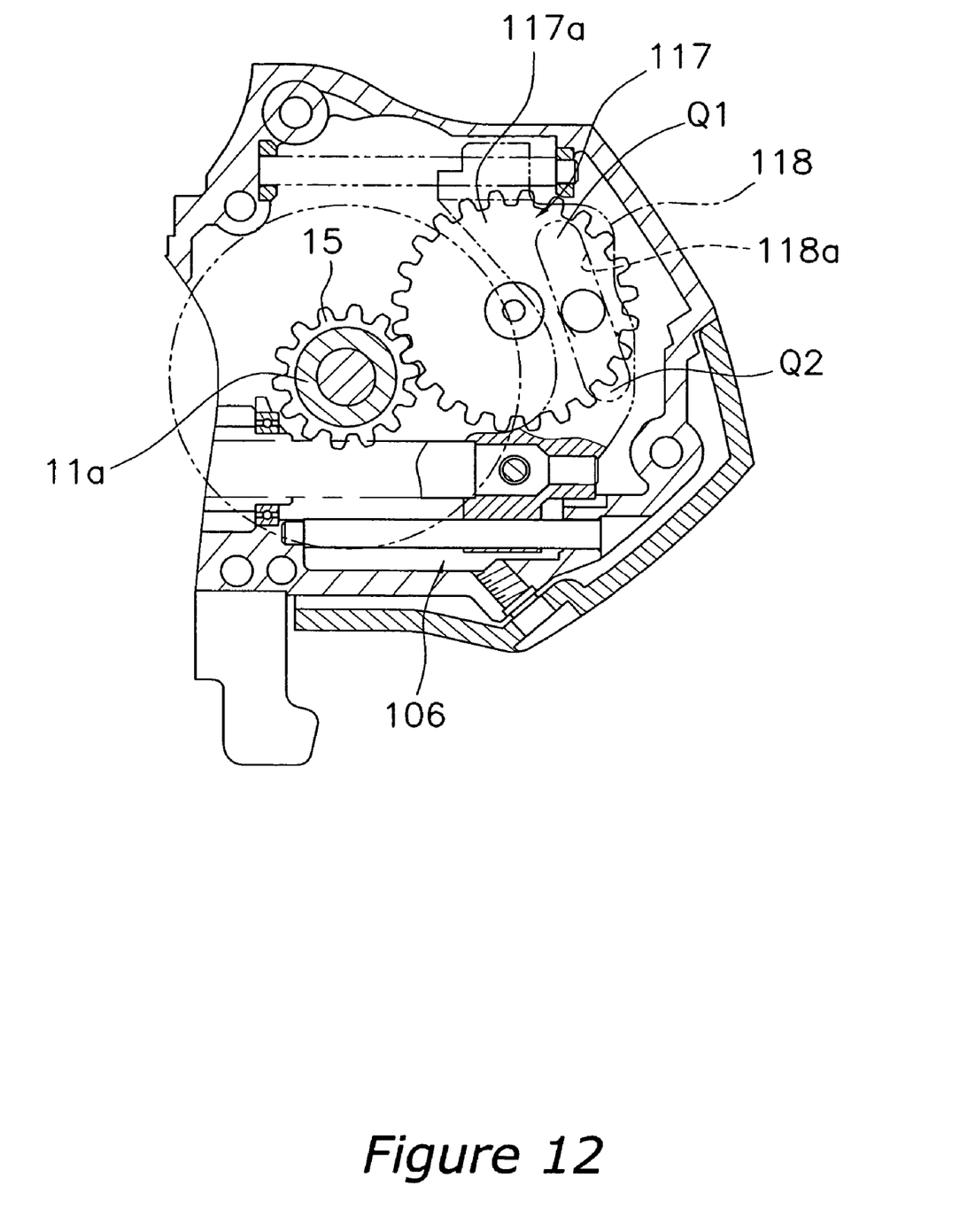
FIG. 12 is an enlarged cross-sectional view of an oscillating mechanism in accordance with another embodiment of the present invention.

The oscillation mechanism 106 of FIG. 12 includes the driving gear 15 arranged on the master gear shaft 11a, a cam gear unit 117, a slider 118, and the guiding portion 19. The driving gear 15 directly meshes with a gear portion 117a of the cam gear unit 117. The cam gear unit 117 is located rear side and on the fishing rod attachment side relative to the master gear shaft 11a. A cam receiving portion 118a of the slider 118 includes a cam groove that is formed to linearly and diagonally extend toward lower right such that its first end Q1 on the attachment portion 2c side is positioned forward of its second end Q2 on the opposite side. Moreover, not non-circular gears but circular gears are used as the driving gear 15 and the gear portion 117a. The rest of the structure is the same as in the above embodiment, and will therefore not be described again.

(b) In the foregoing embodiment, the front drag type of spinning reel is described as a concrete example, however the present invention is not limited to this configuration. The present invention can be applied to any kinds of traverse cam type oscillating devices of spinning reels, such as a spinning reel lever-brake type spinning reel, a rear-drag type spinning reel, a lever-drag type spinning reel, and a closed-face type spinning reel, for example. Besides, in the case of a rear-drag type spinning reel, a spool shaft is mounted to a slider rotatably and immovably in the axial direction.

(c) In the foregoing embodiment, the bi-lobe, and quad-lobe non-circular gears are described as concrete examples, however, any multi-lobe non-circular gear, such as quad-lobe, penta-lobe and hexa-lobe can be used, and the number of lobes is not limited.

According to the present invention, since the cam gear is arranged to be closer to the fishing rod attachment side than the master gear shaft provided with the driving gear, the cam gear is positioned to be closer to a fishing rod. Accordingly, the center of gravity of the reel shifts to be closer to the fishing rod attachment side than a conventional spinning reel. This can reduce the load, which a user feels. Furthermore, since the cam gear is arranged on the fishing rod attachment side, it is possible to reduce the thickness of the opposite side, i.e., the lower side, of the reel unit.

As used herein, the following directional terms "forward, rearward, above, downward, vertical, horizontal, below and transverse" as well as any other similar directional terms refer to those directions of a device equipped with the present invention. Accordingly, these terms, as utilized to describe the present invention should be interpreted relative to a device equipped with the present invention.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Applications Nos. 2003-410131 and 2004-045644. The entire disclosure of Japanese Patent Applications Nos. 2003-410131 and 2004-045644 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A spinning-reel oscillating device for axially oscillating a spool in cooperation with handle rotation via a spool shaft, the handle rotation being transmitted to a master gear that is attached to a master gear shaft for rotating a rotor in cooperation with the handle rotation, a fishing line being adapted to be wound on the spool by the rotor rotatably attached to a reel unit, the spinning reel being adapted to be attached to a fishing rod, the spinning-reel oscillating device comprising:

a driving gear adapted to be arranged on the master gear shaft so as to be spaced apart from the master gear that is attached to the master gear shaft;

a cam gear that has a cam on its side surface and is arranged on a fishing rod attachment side within the spinning-reel oscillating device relative to the master gear shaft, the cam gear being adapted to be attached to the reel unit so as to be rotatable about a first shaft in cooperation with the driving gear, the first shaft being substantially parallel to the master gear shaft;

a slider that has a cam receiving portion formed to engage with the cam of the cam gear, the slider being attached to the rear of the spool shaft such that the spool shaft and the slider are relatively immovable at least in the axial direction; and a guiding portion that is provided in the reel unit and formed to guide the slider such that the slider is movable in the axial direction relative to the guiding portion.

2. The spinning-reel oscillating device set forth in claim 1, further comprising an intermediate gear attached to the reel unit so as to be rotatable about a second shaft that is substantially parallel to the master gear shaft, the intermediate gear including a first gear that meshes with the driving gear and has more teeth than the driving gear does, and a second gear that is arranged concentrically with the first gear, meshes with the cam gear, and has fewer teeth than the cam gear does.

3. The spinning-reel oscillating device set forth in claim 2, wherein the second shaft is arranged on the fishing rod attachment side relative to the first shaft.

4. The spinning-reel oscillating device set forth in claim 2, wherein the driving gear and the first gear are circular gears, and the second gear and the cam gear are non-circular gears.

5. The spinning-reel oscillating device set forth in claim 1, wherein the cam receiving portion is arranged on the fishing rod attachment side relative to the spool shaft.

6. The spinning-reel oscillating device set forth in claim 1, wherein
the cam receiving portion is arranged closer to the master gear than the spool shaft is.

7. The spinning-reel oscillating device set forth in claim 1, wherein
the guiding portion includes two guiding shafts that are arranged substantially in parallel to the spool shaft and support the slider on the fishing rod attachment side and the opposite side.

8. The spinning-reel oscillating device set forth in claim 1, wherein
the cam includes a cam pin formed to protrude toward the slider, and
the cam receiving portion includes a cam groove that is formed to engage with the cam pin and to extend diagonally such that a fishing rod attachment side end of the cam groove is positioned forward relative to an opposite side end of the cam groove.

9. The spinning-reel oscillating device set forth in claim 8, wherein
the cam groove further includes
a curved portion curved convexly forward from the fishing rod attachment end of the cam groove,
a first linear portion formed linearly and diagonally rearward from the curved portion, and
a second linear portion extending linearly from the opposite side end toward the fishing rod attachment side end of the cam groove.

10. The spinning-reel oscillating device set forth in claim 8, wherein
the cam groove extends linearly between the fishing rod attachment side end and the opposite side end.

11. A spinning-reel adapted to be attached to a fishing rod, the spinning reel, comprising:
a reel unit, having a handle and an oscillating device, handle rotation being transmitted to a master gear that is attached to a master gear shaft;
a rotor supported rotatably in front of the reel unit, the rotor being rotated in cooperation with the handle rotation around a spool shaft; and
a spool disposed in front of the rotor, a fishing line being adapted to be wound on the spool by the rotor;
the oscillating device being for axially oscillating the spool in cooperation with the handle rotation via the spool shaft and including:
a driving gear adapted to be arranged on the master gear shaft so as to be spaced apart from the master gear that is attached to the master gear shaft;
a cam gear that has a cam on its side surface and is arranged on a fishing rod attachment side within the spinning-reel oscillating device relative to the master gear shaft, the cam gear being adapted to be attached to the reel unit so as to be rotatable about a first shaft in cooperation with the driving gear, the first shaft being substantially parallel to the master gear shaft;
a slider that has a cam receiving portion formed to engage with the cam of the cam gear, the slider being attached to the rear of the spool shaft such that the spool shaft and the slider are relatively immovable at least in the axial direction; and
a guiding portion that is provided in the reel unit and formed to guide the slider such that the slider is movable in the axial direction relative to the guiding portion.

12. The spinning reel set forth in claim 11, further comprising
an intermediate gear attached to the reel unit so as to be rotatable about a second shaft that is substantially parallel to the master gear shaft, the intermediate gear including
a first gear that meshes with the driving gear and has more teeth than the driving gear does, and
a second gear that is arranged concentrically with the first gear, meshes with the cam gear, and has fewer teeth than the cam gear does.

13. The spinning reel set forth in claim 12, wherein the second shaft is arranged on the fishing rod attachment side relative to the first shaft.

14. The spinning reel set forth in claim 12, wherein
the driving gear and the first gear are circular gears, and the second gear and the cam gear are non-circular gears.

15. The spinning reel set forth in claim 11, wherein
the cam receiving portion is arranged on the fishing rod attachment side relative to the spool shaft.

16. The spinning reel set forth in claim 11, wherein
the cam receiving portion is arranged closer to the master gear than the spool shaft is.

17. The spinning reel set forth in claim 11, wherein
the guiding portion includes two guiding shafts that are arranged substantially in parallel to the spool shaft and support the slider on the fishing rod attachment side and the opposite side.

18. The spinning reel set forth in claim 11, wherein
the cam includes a cam pin formed to protrude toward the slider, and
the cam receiving portion includes a cam groove that is formed to engage with the cam pin and to extend diagonally such that a fishing rod attachment side end of the cam groove is positioned forward relative to an opposite side end of the cam groove.

19. The spinning reel set forth in claim 18, wherein
the cam groove further includes
a curved portion curved convexly forward from the fishing rod attachment end of the cam groove,
a first linear portion formed linearly and diagonally rearward from the curved portion, and
a second linear portion extending linearly from the opposite side end toward the fishing rod attachment side end of the cam groove.

20. The spinning reel set forth in claim 18, wherein
the cam groove extends linearly between the fishing rod attachment side end and the opposite side end.

* * * * *